US010119820B2

(12) United States Patent
Rozelle et al.

(10) Patent No.: US 10,119,820 B2
(45) Date of Patent: Nov. 6, 2018

(54) WIDE RIM VIBRATORY RESONANT SENSORS

(71) Applicants: David M. Rozelle, Woodland Hills, CA (US); Youngmin Albert Choi, Agoura Hills, CA (US); James M. Pavell, Thousand Oaks, CA (US)

(72) Inventors: David M. Rozelle, Woodland Hills, CA (US); Youngmin Albert Choi, Agoura Hills, CA (US); James M. Pavell, Thousand Oaks, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 451 days.

(21) Appl. No.: 14/618,773

(22) Filed: Feb. 10, 2015

(65) Prior Publication Data
US 2016/0231113 A1    Aug. 11, 2016

(51) Int. Cl.
*G01C 25/00*    (2006.01)
*G01C 19/5691*    (2012.01)

(52) U.S. Cl.
CPC .......... *G01C 19/5691* (2013.01); *G01C 25/00* (2013.01)

(58) Field of Classification Search
CPC .......................... G01C 25/00; G01C 19/5691
(Continued)

(56) References Cited

U.S. PATENT DOCUMENTS 3,680,391 A * 8/1972 Denis ................ G01C 19/5691
                                                              73/504.13
4,157,041 A * 6/1979 Loper, Jr. .......... G01C 19/5691
                                                              73/504.13
(Continued)

FOREIGN PATENT DOCUMENTS

CN        101 968 359 B     11/2011
EP         1445581 A1 *    8/2004    ......... G01C 19/5691
(Continued)

OTHER PUBLICATIONS

Extended European Search Report for corresponding EP 16 00 0337 dated Jul. 26, 2016.
(Continued)

*Primary Examiner* — Lisa Caputo
*Assistant Examiner* — Jamel Williams
(74) *Attorney, Agent, or Firm* — Tarolli, Sundheim, Covell & Tummino LLP

(57) ABSTRACT

A gyroscope sensor is provided that comprises a resonator including a stem extending along an axis and a shell extending from the stem. The shell includes a hemispherical portion extending from the stem and a cylindrical portion extending from the hemispherical portion. The cylindrical portion includes an outer surface and an inner surface and terminates at an axial end surface that is perpendicular to the outer surface and the inner surface. The resonator further comprises an inner cylindrical substrate that extends along an axis and includes a set of inner electrodes arranged annularly about the axis, and a passage that extends along the axis through a central region of the inner cylindrical substrate. The stem extends through the passage to position the inner cylindrical substrate within the inner surface of the cylindrical portion of the resonator forming gaps between the set of inner electrodes and the inner surface.

19 Claims, 3 Drawing Sheets

(58) Field of Classification Search
USPC .................................................. 73/504.02
See application file for complete search history.

(56) References Cited

U.S. PATENT DOCUMENTS

| | | | |
|---|---|---|---|
| 6,474,161 B1 | 11/2002 | Jeanroy et al. | |
| 7,694,595 B2 | 4/2010 | James et al. | |
| 8,109,145 B2* | 2/2012 | Stewart | G01C 19/5691 73/504.12 |
| 9,303,995 B2* | 4/2016 | Eudier | G01C 19/5691 |
| 2003/0010120 A1 | 1/2003 | Jeanroy | |
| 2007/0089509 A1* | 4/2007 | Varty | G01C 19/5691 73/504.02 |
| 2012/0144917 A1 | 6/2012 | Painter | |
| 2012/0204641 A1* | 8/2012 | Vandebeuque | G01C 19/5691 73/504.13 |
| 2014/0360266 A1* | 12/2014 | Su | G01C 19/5691 73/504.13 |
| 2016/0334214 A1* | 11/2016 | Saito | G01C 19/5691 |

FOREIGN PATENT DOCUMENTS

| | | | | |
|---|---|---|---|---|
| FR | 2919718 A1 * | 2/2009 | | G01C 19/5691 |
| JP | 2002543374 A | 12/2002 | | |
| JP | 2003-534534 A | 11/2003 | | |

OTHER PUBLICATIONS

Office Action dated Feb. 17, 2017 for corresponding JP 2016-022727.

\* cited by examiner

Inner Electrodes    Rim Electrodes

WIDE RIM VIBRATORY RESONANT SENSORS

TECHNICAL FIELD

The present invention relates generally to inertial sensors, and more particularly to wide rim vibratory resonant sensors.

BACKGROUND

Coriolis Vibratory Gyroscopes (CVGs) are useful for measuring or detecting angular movement or acceleration and are based on vibrating mechanical elements which sense rotation. A resonator of a CVG is excited into vibration at its resonant frequency. The direction or orientation of vibration is configured so that it couples with the rotation of the sensor allowing the vibration to be analyzed to sense directional changes. A readout and control system is used to apply excitation energy to the resonator of the CVG and to sense the resulting vibration. A number of circuits are employed to excite the resonator to resonance, sense the vibration and to produce an output indicative of rotational rate.

In certain CVGs, a readout circuit extracts the charge from one or more capacitive pickoffs of a vibratory gyroscope to measure the amplitude of the resonator vibration. The resonator vibration responds to the amplitude of a drive signal supplied to one or more forcer electrodes to induce or modify the vibration in the gyroscope resonator. Capacitive pickoffs may be used to measure the vibratory displacement of the resonator through the electrical charge they produce. The charge from the capacitive pickoff(s) is transferred to an integration capacitor ($C_F$) or feedback resistor ($R_F$) where the charge is converted to an output voltage. That output voltage is sampled and, for the anti-nodal channels, is used to measure the amplitude of the resonator vibration. A controller adjusts the drive amplitude to maintain the measured vibration amplitude at a predetermined value. Also, by measuring both in-phase and quadrature components of the anti-nodal signal, it is possible to determine frequency error (i.e. deviation between the excitation frequency and the resonant frequency). A controller can then use this information to correct the frequency and ensure the drive tracks the resonant frequency of the CVG.

In one example of a CVG, a typical resonator can be composed of a thin shell of fused quartz having a hemispherical geometry. The shape of the resonator can be specified by specifying the diameter or the outer shell surface, the inner shell surface, with the shell surfaces having a common sphere center and the shell having a uniform thickness. Eight electrodes can be constructed on a partial hemispherical dome surface residing inside the resonator, and 32 electrodes can be constructed on the inside of a partial hemispherical cavity residing outside the resonator. The inner electrodes are used as pickoffs and the outer electrodes as forcers. The forcers provide the method for controlling the amplitude and location of the standing wave of the resonator. That is they hold the standing wave pattern at a given case position by applying a force proportional to the rotation rate of the gyro, they provide a force to keep the amplitude of the standing wave at a desired amplitude and they provide the forces that keep a standing wave in quadrature to the desired state from developing.

The feedback signals to the forcers from the gyro control loops are each of different frequency content which helps decouple the loops, thus minimizing cross-talk between the control loops. The 'rate' servo is controlled with an AC signal at a frequency, omega, synchronous to the standing wave. The 'amplitude' servo uses a signal at 2*omega which drives what is termed the 'parametric' drive. The 'quadrature' loop keeps a traveling wave from developing using DC signals to balance the frequencies of the two gyro modes. In order to decrease the size of this design the outer electrodes can be eliminated, and the gyro control method modified so that the gyro utilizes only the 8 inner electrodes for both pickoff and forcer functionality. To operate with this reduced set of electrodes the gyro needs to be mechanized using one-omega signals for all three of the control loops. The result is that control loop cross-coupling creates performance issues for the gyro.

SUMMARY

In one example embodiment, a vibratory sensor is provided that comprises a resonator including a stem extending along an axis and a shell extending from the stem. The shell includes a hemispherical portion extending from the stem and a cylindrical portion extending from the hemispherical portion. The cylindrical portion includes an outer surface and an inner surface and terminates at an axial end surface that is perpendicular to the outer surface and the inner surface. The CVG sensor further comprises an inner cylindrical and partial hemispherical substrate that extends along an axis and includes a set of inner electrodes arranged annularly about the outer surface of the cylinder/hemisphere, and a cylindrical passage that extends along the axis through a central region of the inner cylindrical substrate. The stem extends through the passage to position the inner cylindrical substrate within the inner surface of the cylindrical and hemispherical portion of the resonator forming uniform gaps between the set of inner electrodes and the inner surface of the resonator.

In accordance with another example embodiment, a gyroscope sensor is provided that comprises a resonator including a stem extending along an axis and a shell extending from the stem. The shell includes a hemispherical portion extending from the stem. The hemispherical portion includes an outer surface and an inner surface and terminates at an axial end surface that is perpendicular to the outer surface and the inner surface. The gyroscope further comprises an integraated substrate having a set of inner electrodes arranged annularly about the axis, and a passage that extends along the axis through a central region of the inner cylindrical portion. The stem extends through the passage to position the hemispherical end surface at a constant distance over the substrate surface. The integrated substrate further comprises a top surface and a bottom surface with a set of rim electrodes arranged circumferentially about the top surface positioned such that the set of rim electrodes are positioned about and spaced apart from axial end surface of the hemispherical portion of the resonator to form gaps between the set of rim electrodes and the axial end surface forming gaps between the set of rim electrodes and the axial end surface.

In accordance with another example embodiment, a method of forming a gyroscope sensor is provided. The method comprises fabricating a resonator including a stem extending along an axis and a shell extending from the stem. The shell has a hemispherical portion extending from the stem and a cylindrical portion extending from the hemispherical portion. The cylindrical portion includes an outer surface and an inner surface and terminating at an axial end surface that is parallel to the outer surface and the inner surface. The method further comprises fabricating an integrated substrate with an inner cylindrical portion that extends along an axis and includes a set of inner electrodes arranged annularly about the axis, and a passage that extends along the axis through a central region of the inner cylindrical portion and an outer cylindrical portion that extends along an axis and includes a top surface and a bottom surface with a set of rim electrodes arranged circumferentially about the top surface. The method further comprises coupling the integrated substrate to the resonator, such that the stem extends through the passage to position the inner cylindrical portion within the inner surface of the cylindrical portion of the resonator forming gaps between the set of inner electrodes and the inner surface of the cylindrical portion of the resonator, and the outer cylindrical portion is positioned such that set of rim electrodes are positioned about and spaced apart from the axial end surface of the cylindrical portion of the resonator forming gaps between the set of rim electrodes and the axial end surface.

DETAILED DESCRIPTION

The present disclosure is directed to a vibratory resonant sensor (e.g., a hemispherical resonator gyroscope (HRG) sensor) which has an inner cylindrical geometry section at and near the rim of a hemispherical shell. The cylindrical geometry section increases the surface area at the axial end surface of the rim. Therefore, rim electrodes can be employed aligned and spaced apart from axial end surface of the rim to provide a force large enough to be effective for resonator control, since when a resonator of a HRG is excited, for example, in a N=2 mode, the rim of the resonator not only flexes radially but also moves axially, modulating the gap between the rim and the surface below it.

The cylindrical geometry section is also simpler to machine to high precision than the conventional hemispherical shaped inner geometry section. That is the critical dimension of the resonator is now the inner diameter of the cylindrical geometry. The tolerances of a cylindrical geometry is much easier to meet that the tolerance of a hemispherical inner diameter and easier to metalize with constant thickness over insulating areas. Additionally, the increased mass provides for larger kinetic energy that is less susceptible to error forces to provide more effective control. This also provides for a simpler to fabricate inner electrode assembly that can also be generally cylindrical in shape, since the only required precision is the outer diameter of the inner electrode assembly and the bottom surface, which only needs to be flat.

The inner electrode assembly can readily fit over a stem of the hemispherical shell and include cylindrical shaped sensor plates spaced apart from the hemispherical shell to form sensing capacitors. The resonant frequency of the resonator will increase as the outer diameter of the rim increases because of the stiffness of the rim increases with thickness. The higher frequency and thicker rim would also make the gyroscope less susceptible to environmental inputs since the frequency would be above most vibration sources and is readily eliminated through isolators.

Furthermore, due to the wider axial end surface of the rim of the hemispherical shell, rim electrodes can be employed that are aligned with the wider axial end surface to provide quadrature control or amplitude control decoupled from the rate control/pickoffs. Alternatively, rim electrodes can be employed that are aligned with the thicker axial end surface to provide rate control for additional forcer authority for higher rate ranges. This allows for a compact gyroscope geometry without requiring the additional outer electrodes and their associated functionality. The HRG can employ 1-omega rate control, 2-omega amplitude control and DC quadrature control to provide improved performance over a HRG that does not employ outer electrodes.

Figure 1:
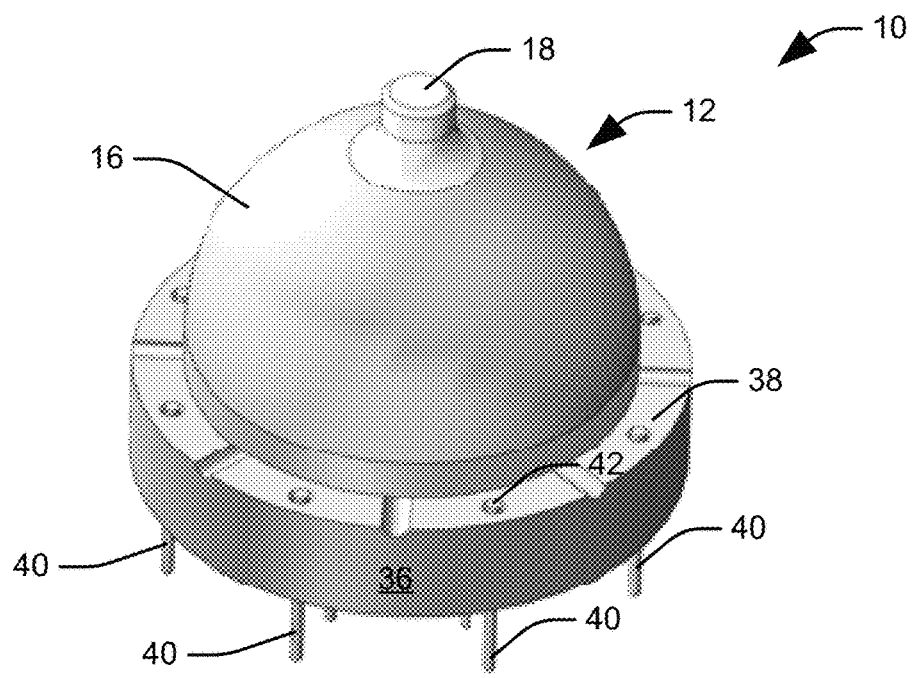
FIG. 1 illustrates an example embodiment of a perspective view of a HRG sensor.
Figure 2:
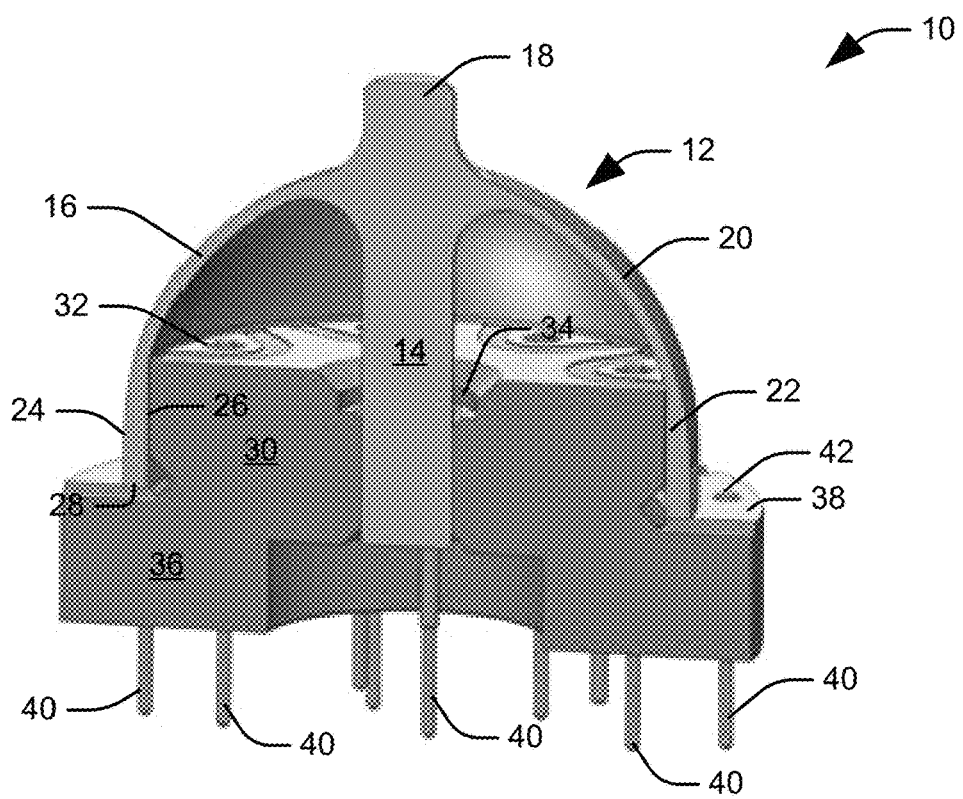
FIG. 2 illustrates a cross-sectional view of the HRG sensor of FIG. 1 through a plane that extends vertically through its central axis.

FIG. 1 illustrates an example of a perspective view of a HRG sensor 10. FIG. 2 illustrates a cross-sectional view of the HRG sensor 10 through plane that extends vertically through its central axis. The HRG sensor 10 includes a resonator 12 having a stem 14 extending along an axis with a shell 16 extending from a top of the stem 14 below a cap portion 18 of the stem. The shell 16 substantially surrounds the stem 14 to provide a generally mushroom like shaped resonator. However, the stem 14 and the shell 16 could be configured in a generally wine glass like or other axi-symmetrical shaped resonator. The shell 16 includes a hemispherical portion 20 extending from the top of the stem 14 and a cylindrical portion 22 extending from the hemispherical portion 20. The cylindrical portion 22 has an outer surface 24 and an inner surface 26 and terminates at an axial end surface 28 that is perpendicular to the outer surface 24 and the inner surface 26 of the cylindrical portion 22. The resonator 12 can be made of fused quartz (or other materials that have high Q factors) that is coated with a conductive metal coating by spray on metal or metal plating, so that the resonator 12 can be held at a fixed potential (e.g., +/−100 volts) during operation.

As shown in FIG. 2, an inner cylindrical substrate 30 extends along an axis and includes a set of inner electrodes 32 arranged and separated from one another annularly about the axis. A passage 34 extends along the axis through a central region of the inner cylindrical substrate 30, wherein the stem 14 extends through the passage 34 to position and hold the inner cylindrical substrate 30 within the inner surface 26 of the cylindrical portion 22 of the resonator 12 forming gaps between the set of inner electrodes 32 and the inner surface 26 of the cylindrical portion 22. The gaps can be held and centered readily by the utilization of shims (not shown).

An outer cylindrical substrate 36 also extends along an axis and includes a top surface and a bottom surface with a set of rim electrodes 38 arranged and spaced from one another circumferentially about the top surface of the outer cylindrical substrate 36. The outer cylindrical substrate 36 is positioned such that set of rim electrodes 38 are positioned in parallel forming a gap with portions of the axial end surface 28 of the cylindrical portion 22 of the resonator 12. The outer cylindrical substrate 36 is fixed to the inner cylindrical substrate 30 by affixing, bonding, or by forming the outer and inner cylindrical substrates as an integral piece. The gaps between the rims electrodes 38 and axial end surface 28 can be readily set by shims (not shown). The capacitance between respective inner electrodes 32 and the inner surface 26 of the cylindrical portion 22 of the resonator 12 and the rim electrodes 38 and the axial end surface 28 of the resonator 12 can be employed for both pickoff measurement and forcer electrodes in which the amount of force employed to hold the gap constant provides a measurement of rotation rate.

Hermetic feed-through pins 40 extend from termination contacts 42 on each of the inner electrodes 32 and the rim electrodes 38 through one or both of the inner cylindrical substrate 30 and the outer cylindrical substrate 36 to provided electrical connection to the inner electrodes 32 and rim electrodes 38 to a measurement and control device. The inner cylindrical substrate 30 and outer cylindrical substrate 36 can be formed from fused silica, or a ceramic material with the electrodes being formed from spray on metal or metal plating or deposition and etching.

In one example arrangement, amplitude pickoff electrodes are arranged at a 0° location and a 180° location, while amplitude forcer electrodes are arranged at a 90° location and 270° location about the resonator 12. Additionally, rate pickoff electrodes are arranged at a 45° location and a 235° location, while rate forcer electrodes are arranged at a 135° location and a 315° location about the resonator 12. Additionally, quadrature forcer electrodes are arranged at 22.5°, 112.5°, 202.5° and 292.5°, 67.5°, 157.5°, 247.5° and 337.5° about the resonator 12. This arrangement would allow for eight inner electrodes 32 being all of the amplitude and rate forcer and pickoff electrodes and eight rim electrodes 36 being all of the quadrature forcer electrodes. An alternative arrangement would allow for eight rim electrodes 36 being all of the amplitude and rate forcer and pickoff electrodes and eight inner electrodes 32 being all quadrature forcer electrodes.

It is to be appreciated that this is just a few examples, and a variety of electrode arrangements could be provided for additional rate and pickoff control, for example, in the inner cylindrical substrate with quadrature and amplitude control in the outer cylindrical substrate. In another arrangement, all of the pickoff electrodes could be inner electrodes and all of the forcer electrodes could be rim electrodes or vice versa. Yet another arrangement could be to utilize the rim electrodes for quadrature and amplitude control decoupled from rate pickoff control, where additional inner electrodes could be utilized for additional forcer authority for higher rate ranges. The use of inner electrodes and rim electrodes provides for a compact HRG design without sacrificing functionality.

Figure 3:
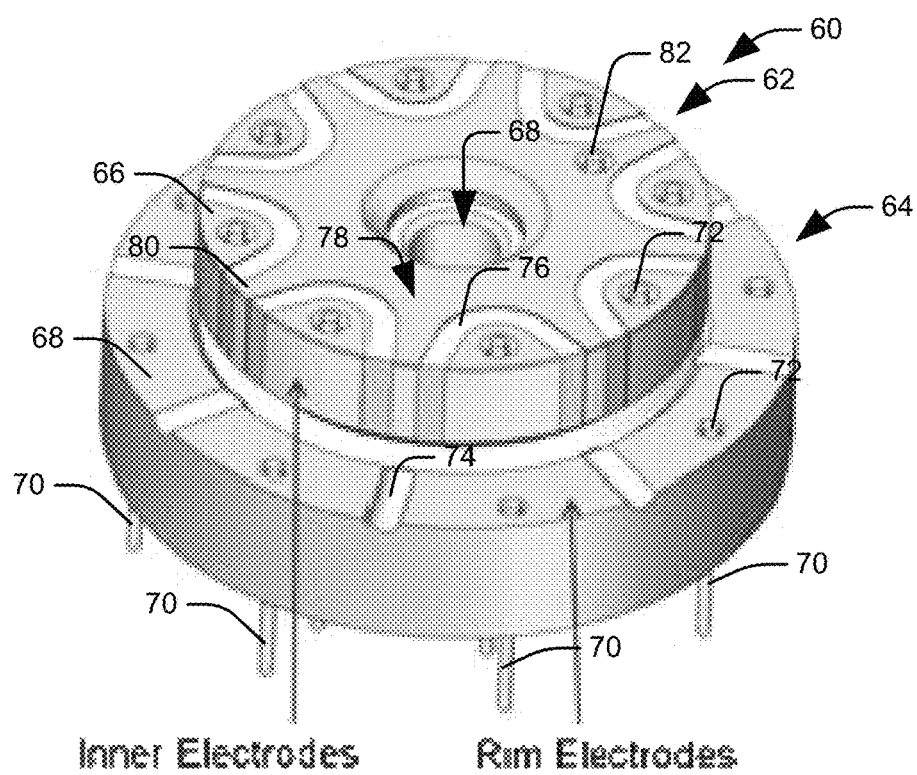
FIG. 3 illustrates one example of an integrated substrate.

FIG. 3 illustrates one example of an integrated substrate assembly 60 in which an inner cylindrical substrate 62 and an outer cylindrical substrate 64 are formed as a single piece for mating with a resonator such as that described in FIGS. 1-2. The inner cylindrical substrate 62 extends along an axis and includes a set of inner electrodes 66 arranged and separated from one another annularly about the axis. A passage 68 extends along the axis through a central region of the inner cylindrical substrate 62 configured to receive a stem of a resonator. The outer cylindrical substrate 64 also extends along an axis and includes a top surface and a bottom surface with a set of rim electrodes 68 arranged and spaced from one another circumferentially about the top surface of the outer cylindrical substrate 64. Hermetic feed-through pins 70 extend from termination contacts 72 on each of the inner electrodes 66 and the rim electrodes 68 extend through one or both of the inner cylindrical substrate 62 and the outer cylindrical substrate 64 to provide electrical connection to the inner electrodes 66 and rim electrodes 68 to a measurement and control device (not shown).

A single gap 74 in metallization is provided between each rim electrode 68 on the outer cylindrical substrate 64 to isolate each rim electrode from adjacent rim electrodes. Each of the inner electrodes 66 are surrounded by non-metalized regions 76 both on the annular and top surface of the inner cylindrical substrate 62. Furthermore, a metalized plate 78 resides on the top surface of the inner cylindrical substrate 62 with leaf like metalized guard electrodes 80 that extend between the non-metalized regions 76 on the top and annular surface of the inner cylindrical substrate 62. The metalized plate 78 can be connected to a fixed voltage source (e.g., ground) via a hermetic feed-through pin (not shown) that extends from a termination contact 82 electrically coupled to the conductive plate 78 through the inner cylindrical substrate 62 and the outer cylindrical substrate 64 to provide electrical connection to the conductive plate 78. This further isolates each inner electrode 66 from one another by mitigating (e.g., blocking) noise caused by signals from adjacent inner electrodes.

Figure 4:
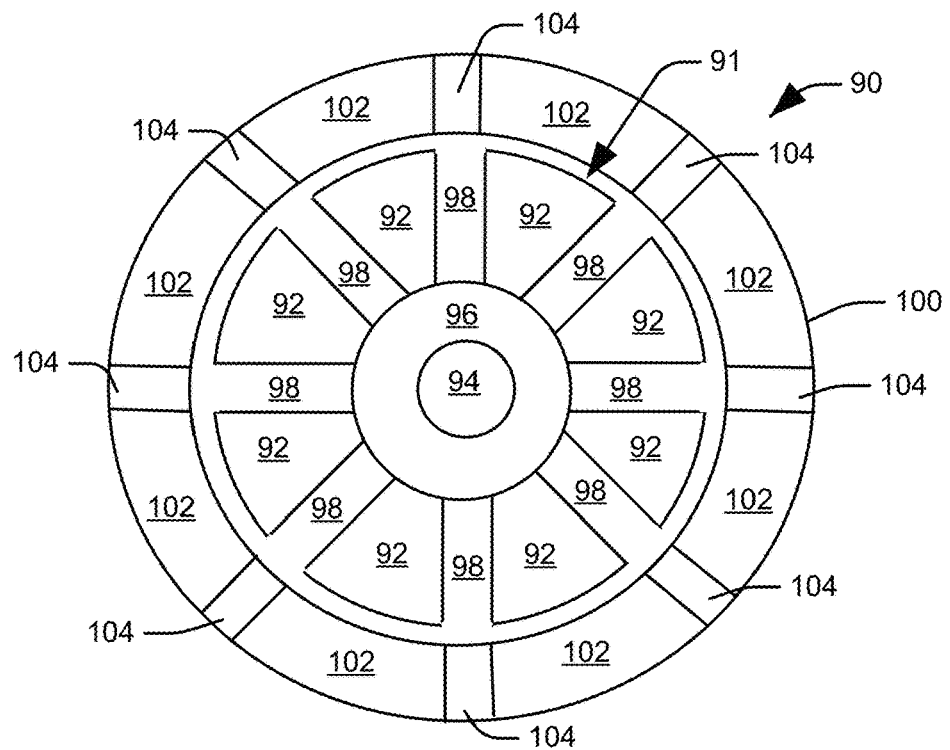
FIG. 4 illustrates a top view of another example of an integrated substrate.

FIG. 4 illustrates a top view of another example of an integrated substrate 90 having an inner cylindrical substrate 91 overlying an outer cylindrical substrate 100. The outer cylindrical substrate 100 is similar to the outer cylindrical substrate 64 of FIG. 3, and includes a set of rim electrodes 102 arranged and spaced from one another circumferentially about the top surface of the outer cylindrical substrate 100 spaced apart from one another by gaps 104 in metallization. The inner cylindrical substrate 91 extends along an axis and includes a set of inner electrodes 92 arranged and separated from one another annularly about the axis. A passage 94 extends along the axis through a central region of the inner cylindrical substrate 90 configured to receive a stem of a resonator. The inner electrodes 92 are separated from the passage by a non-metallization portion 96, while the inner electrodes 92 are isolated on the top surface and annual surface from adjacent electrodes by air gaps 98. In this manner, air between the gaps 98 also serves to mitigate (e.g., block) noise caused by signals from adjacent inner electrodes.

Figure 5:
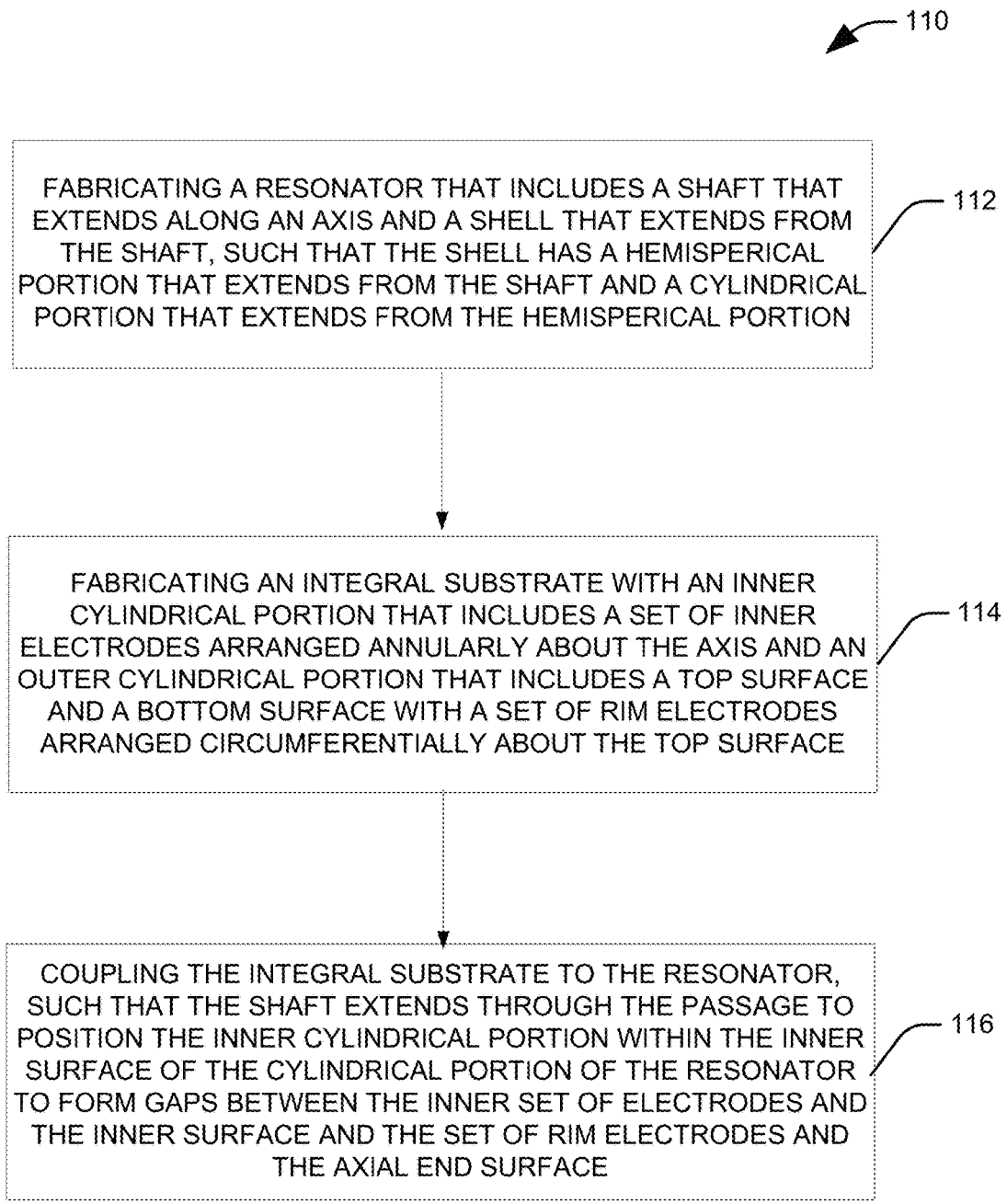
FIG. 5 illustrates an example embodiment of a method of forming a gyroscope sensor.

In view of the foregoing structural and functional features described above, a methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described.

FIG. 5 illustrates an example embodiment of a method 110 of forming a gyroscope sensor. The method starts at 112 where a resonator is fabricated that includes a stem extending along an axis and a shell extending from the stem. The shell has a hemispherical portion extending from the stem and a cylindrical portion extending from the hemispherical portion. The cylindrical portion includes an outer surface and an inner surface that terminates at an axial end surface that is parallel to the outer surface and the inner surface. At 114, an integrated substrate is fabricated with an inner cylindrical portion that extends along an axis and includes a set of inner electrodes arranged annularly about the axis with a passage that extends along the axis through a central region of the inner cylindrical portion, and an outer cylindrical portion that extends along an axis and includes a top surface and a bottom surface with a set of rim electrodes arranged circumferentially about the top surface.

At 116, the integrated substrate to is coupled to the resonator, such that the stem extends through the passage to position the inner cylindrical portion within the inner surface of the cylindrical portion of the resonator forming gaps between the set of inner electrodes and the inner surface of the cylindrical portion of the resonator, and the outer cylindrical portion is positioned such that set of rim electrodes are positioned about and spaced apart from the axial end surface of the cylindrical portion of the resonator forming gaps between the set of rim electrodes and the axial end surface.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A vibratory resonant sensor comprising:
a resonator including a stem extending along an axis and a shell extending from the stem, the shell having a hemispherical portion extending from the stem and a cylindrical portion extending from the hemispherical portion, the cylindrical portion having an outer surface and an inner surface and terminating at an axial end surface that is parallel to the outer surface and the inner surface;
an inner cylindrical substrate that extends along an axis and includes a set of inner electrodes arranged annularly about the axis, and a passage that extends along the axis through a central region of the inner cylindrical substrate, wherein the stem extends through the passage to position the inner cylindrical substrate within the inner surface of the cylindrical portion of the resonator forming gaps between the set of inner electrodes and the inner surface of the cylindrical portion; and,
an outer cylindrical substrate that extends along an axis and includes a top surface and a bottom surface with a set of rim electrodes arranged circumferentially about the top surface, the outer cylindrical substrate being positioned such that set of electrodes are positioned about and spaced apart from the axial end surface of the cylindrical portion of the resonator forming gaps between the set of rim electrodes and the axial end surface.

2. The sensor of claim 1, wherein the set of inner electrodes are amplitude pickoff and forcer electrodes and rate pickoff and forcer electrodes and the set of rim electrodes are quadrature control electrodes.

3. The sensor of claim 1, wherein the set of inner electrodes are rate pickoff and forcer electrodes and the set of rim electrodes are amplitude pickoff and forcer electrodes and quadrature control electrodes.

4. The sensor of claim 1, wherein each of the set of inner electrodes and each of the set of rim electrodes are separated from one another by gaps in conductive material between the electrodes.

5. The sensor of claim 4, wherein each of the set of inner electrodes are separated by guard electrodes that are coupled to a fixed voltage source to further isolate each inner electrode from one another by mitigating noise caused from adjacent inner electrodes.

6. The sensor of claim 5, wherein each of the guard electrodes are formed from leafs of a metalized plate formed on the top surface of the inner cylindrical substrate.

7. The sensor of claim 1, further comprising hermetic feed-through pins that extend from termination contacts on each of the inner electrodes and the rim electrodes through one or both of the inner cylindrical substrate and the outer cylindrical substrate to provided electrical connection to the inner electrodes and rim electrodes.

8. The sensor of claim 1, wherein each of the set of inner electrodes are separated by guard electrodes that are coupled to a fixed voltage source to further isolate each inner electrode from one another by mitigating noise caused from adjacent inner electrodes, and each of the guard electrodes are formed from leafs of a metalized plate formed on the top surface of the inner cylindrical substrate.

9. The sensor of claim 1, wherein each of the set of inner electrodes are separated by air gaps in the inner cylindrical substrate to isolate each inner electrode from one another by mitigating noise caused from adjacent inner electrodes.

10. A gyroscope sensor comprising:
a resonator including a stem extending along an axis and a shell extending from the stem, the shell having a hemispherical portion extending from the stem and a cylindrical portion extending from the hemispherical portion, the cylindrical portion having an outer surface and an inner surface and terminating at an axial end surface that is parallel to the outer surface and the inner surface; and
an integrated substrate comprising:
an inner cylindrical portion that extends along an axis and includes a set of inner electrodes arranged annularly about the axis, and a passage that extends along the axis through a central region of the inner cylindrical portion, wherein the stem extends through the passage to position the inner cylindrical portion within the inner surface of the cylindrical portion of the resonator forming gaps between the set of inner electrodes and the inner surface of the cylindrical portion of the resonator; and
an outer cylindrical portion that extends along an axis and includes a top surface and a bottom surface with a set of rim electrodes arranged circumferentially about the top surface, the outer cylindrical portion being positioned such that set of rim electrodes are positioned about and spaced apart from the axial end surface of the cylindrical portion of the resonator forming gaps between the set of rim electrodes and the axial end surface.

11. The sensor of claim 10, wherein the set of inner electrodes are amplitude pickoff and forcer electrodes and rate pickoff and forcer electrodes and the set of rim electrodes are quadrature control electrodes.

12. The sensor of claim 10, wherein the set of inner electrodes are rate pickoff and forcer electrodes and the set of rim electrodes are amplitude pickoff and forcer electrodes and quadrature control electrodes.

13. The sensor of claim 10, wherein each of the set of inner electrodes and each of the set of rim electrodes are separated from one another by gaps in conductive material between the electrodes.

14. The sensor of claim 13, wherein each of the set of inner electrodes are separated by guard electrodes that are coupled to a fixed voltage source to further isolate each inner electrode from one another by mitigating noise caused from adjacent inner electrodes.

15. The sensor of claim 14, wherein each of the guard electrodes are formed from leafs of a metalized plate formed on the top surface of the inner cylindrical substrate.

16. The sensor of claim 10, wherein each of the set of inner electrodes are separated by air gaps in the inner cylindrical portion of the integrated substrate to further isolate each inner electrode from one another by mitigating noise caused from adjacent inner electrodes.

17. A method of forming a gyroscope sensor, the method comprising:
fabricating a resonator including a stem extending along an axis and a shell extending from the stem, the shell having a hemispherical portion extending from the stem and a cylindrical portion extending from the hemispherical portion, the cylindrical portion having an outer surface and an inner surface and terminating at an axial end surface that is perpendicular to the outer surface and the inner surface; and
fabricating an integrated substrate with an inner cylindrical portion that extends along an axis and includes a set of inner electrodes arranged annularly about the axis, and a passage that extends along the axis through a central region of the inner cylindrical portion and an outer cylindrical portion that extends along an axis and includes a top surface and a bottom surface with a set of rim electrodes arranged circumferentially about the top surface; and
coupling the integrated substrate to the resonator, such that the stem extends through the passage to position the inner cylindrical portion within the inner surface of the cylindrical portion of the resonator forming gaps between the set of inner electrodes and the inner surface of the cylindrical portion of the resonator, and the outer cylindrical portion is positioned such that set of rim electrodes are positioned about and spaced apart from the axial end surface of the cylindrical portion of the resonator forming gaps between the set of rim electrodes and the axial end surface.

18. The method of claim 17, wherein each of the set of inner electrodes are separated by guard electrodes that are coupled to a fixed voltage source to further isolate each inner electrode from one another by mitigating noise caused from adjacent inner electrodes, and each of the guard electrodes are formed from leafs of a metalized plate formed on the top surface of the inner cylindrical substrate.

19. The method of claim 17, wherein each of the set of inner electrodes are separated by air gaps in the inner cylindrical substrate to further isolate each inner electrode from one another by mitigating noise caused from adjacent inner electrodes.

* * * * *